United States Patent [19]

Torres et al.

[11] Patent Number: 5,224,688
[45] Date of Patent: Jul. 6, 1993

[54] SELF-CONTAINED VEHICLE LIFT SYSTEM

[76] Inventors: Luis A. Torres, 2016 NW. 89th Ave.; Pedro I. Albert, 2018 NW. 89th Ave., both of Pembroke Pines, Fla. 33024

[21] Appl. No.: 879,905

[22] Filed: May 8, 1992

[51] Int. Cl.⁵ .............................................. B60S 9/02
[52] U.S. Cl. ...................................................... 254/423
[58] Field of Search ........................... 254/423, 418, 45

[56] References Cited

U.S. PATENT DOCUMENTS

| | | | |
|---|---|---|---|
| 1,344,037 | 6/1920 | Heymann | 254/423 |
| 1,583,189 | 5/1926 | Scott | 254/423 |
| 1,719,740 | 7/1929 | Williams | 254/423 |
| 1,809,579 | 6/1931 | Bryant et al. | 254/423 |
| 1,957,151 | 5/1934 | Pollard | 254/423 |
| 2,619,319 | 11/1952 | Lucas | 254/423 |
| 2,764,249 | 9/1956 | Paolucci | 254/423 |
| 4,174,094 | 11/1979 | Valespino et al. | 254/423 |

FOREIGN PATENT DOCUMENTS

| | | | |
|---|---|---|---|
| 828802 | 1/1952 | Fed. Rep. of Germany | 254/423 |
| 430026 | 2/1948 | Italy | 254/423 |
| 411040 | 5/1934 | United Kingdom | 254/423 |

Primary Examiner—Robert C. Watson
Attorney, Agent, or Firm—S. Michael Bender

[57] ABSTRACT

A series of hydraulic jack units are mounted on the frame of a vehicle. Each jack unit is controlled from a central controller inside the vehicle and includes electrical means for activating the jack, automatic means for locking the jack in the extended position, and selectively activatable means for releasing the jack and returning it to its retracted position. As a result of this arrangement, any portion of the vehicle may be raised to facilitate maintenance, or to provide security against theft.

7 Claims, 4 Drawing Sheets

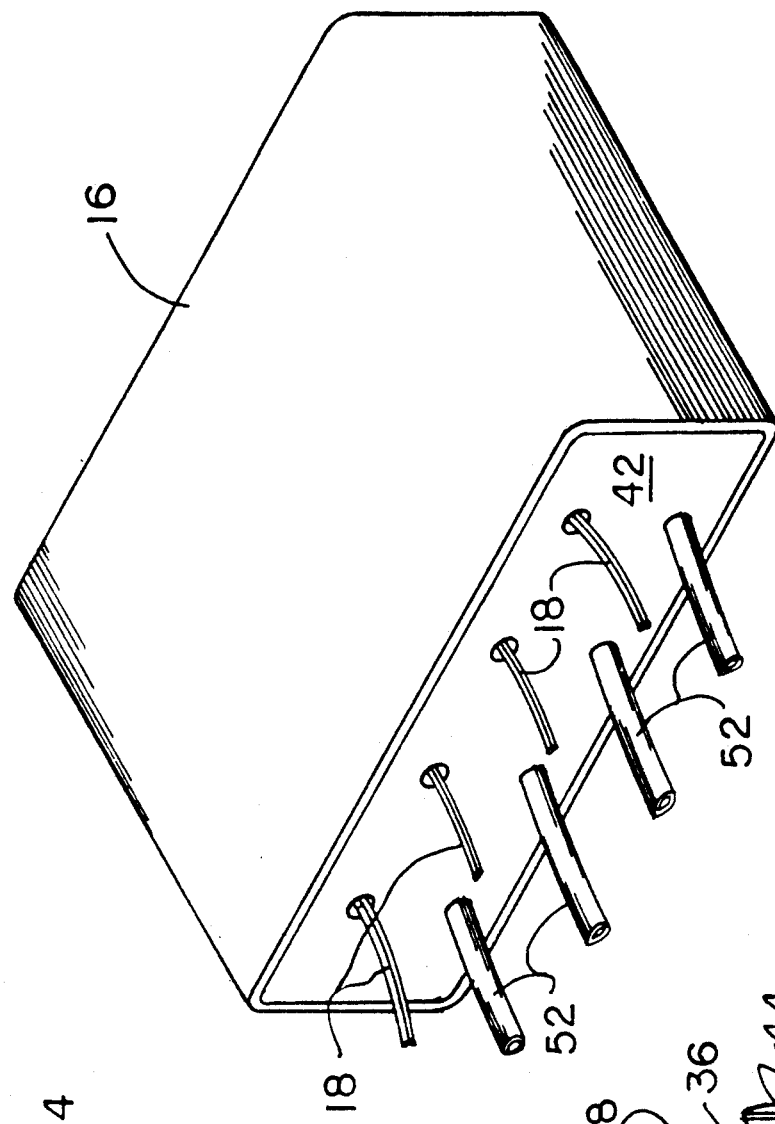
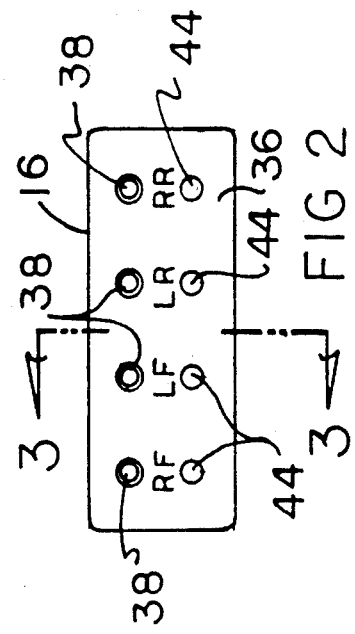
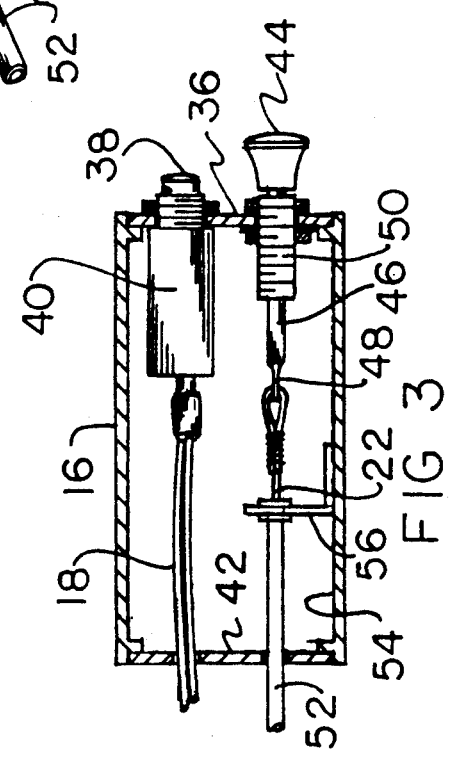

SELF-CONTAINED VEHICLE LIFT SYSTEM

BACKGROUND OF THE INVENTION

1. Field of the Invention

The present invention relates generally to lift systems for vehicles and more particularly, to a self-contained lift system for use on a vehicle incorporating hydraulic jacking units operable from a central controller located inside the vehicle.

2. Description of the Prior Art.

Self-contained vehicle lift systems featuring hydraulic jacks are known in the prior art; however, these typically are large, complicated units, expensive to install and operate, and prone to malfunction. For example, U.S. Pat. No. 4,235,542 discloses a hydraulic lift unit adapted to be mounted on a vehicle wherein a hydraulic motor, hydraulic pump and valve assembly are mounted inside the jack's cylinder. This unit because of its relatively large bulk must include additional means for rotating the jack assembly about a pivot support to an unused position.

Similarly, U.S. Pat. No. 4,635,904 discloses a self-contained vehicle lift system wherein the jacking units are activated by a complex motor-driven gear arrangement. Here again, the relatively large jacking unit is pivotally mounted on the vehicle frame and includes means for rotating the unit from a vertical to a horizontal position.

Other lifting devices have been proposed for stowage aboard a vehicle. For example, in U.S. Pat. No. 4,542,882, an inflatable bag is disclosed having a fitting connected to the exhaust pipe of a vehicle. It is apparent, however, that this device may be used only with the vehicle engine running, a situation which can be dangerous to the vehicle operator.

Finally, portable jacking units are known for use with vehicles, which are capable of being stowed on the vehicle. U.S. Pat. Nos. 4,549,722 and 4,690,378 disclose examples of the latter type. It is apparent, however, that the operator must get out of the vehicle to operate such units, thereby presenting an inconvenience and possible danger from passing vehicles.

SUMMARY OF THE INVENTION

Against the above background of known prior art, a need exists for a self-contained vehicle lift system which may safely be operated from inside the vehicle, and which includes jacking units of relatively compact size thereby avoiding the need for expensive and troublesome pivoting support assemblies.

The foregoing and other advantages are accomplished by the present invention which discloses and claims a remotely controlled, self-contained vehicle lift system comprising a series of hydraulic jacks mounted on the vehicle frame and operable from a central control station inside the vehicle. The jacks are operable between a retracted position permitting the vehicle to move in its normal fashion, and an extended position effective to raise a portion of or the entire vehicle off the ground. Each jack unit is hydraulically activated by "pressing a button" inside the vehicle and includes automatic means for locking the jack's piston arm in its extended position. Additional means, also operable inside the car are provided for releasing the locking means and restoring the jack to its retracted or deactivated position.

The above brief description sets forth rather broadly the more important features of the present invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one preferred embodiment of the invention in detail, as required by statute, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention of the application, which only is measured by the claims, nor is it intended to be limiting as to the scope of the invention in any way.

It is therefore an object of the present invention to provide a new and improved self-contained vehicle lift system which has all the advantages of the prior art and none of the disadvantages thereof.

It is another object of the present invention to provide a new and improved self-contained vehicle lift system which may be easily and efficiently manufactured and marketed.

It is a further object of the present invention to provide a new and improved self-contained vehicle lift system which is of a durable and reliable construction.

An even further object of the present invention is to provide a new and improved self-contained vehicle lift system which is susceptible of a low cost of manufacture with regard to both materials and labor, and which accordingly is then susceptible of low prices of sale to the consuming public, thereby making such self-contained vehicle lift system economically available to the buying public.

Still yet another object of the present invention is to provide a new and improved self-contained vehicle lift system which provides in the apparatuses and methods of the prior art some of the advantages thereof, while simultaneously overcoming some of the disadvantages normally associated therewith.

Still another object of the present invention is to provide a new and improved self-contained vehicle lift system which is capable of being remotely controlled or operated from a location inside the vehicle.

Yet still another object of the present invention is to provide a new and improved self-contained vehicle lift system incorporating hydraulic jack units that are relatively compact in size avoiding the need to pivotally displace the units or remove them from their mounted positions in order for the vehicle to move in its normal intended fashion.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had now to the accompanying drawings and descriptive matter in which there is illustrated at least one preferred embodiment of the invention.

BRIEF DESCRIPTION OF THE DRAWINGS

The invention will be better understood and the above objects as well as objects other than those set forth above, will become apparent when consideration is given to the following detailed description thereof. Such description makes reference to the annexed drawings wherein:

FIG. 2 is an elevational view of the front panel of the control box of the system of the present invention.

FIG. 3 is a sectional view of the control box of FIG. 2 taken along line 3—3.

FIG. 4 is a perspective view of the rear of the control box of the system of the present invention.

DESCRIPTION OF THE PREFERRED EMBODIMENT

With reference now to the drawings, a new and improved self-contained vehicle lift system embodying the principles and concepts of the present invention will be described.

Figure 1:
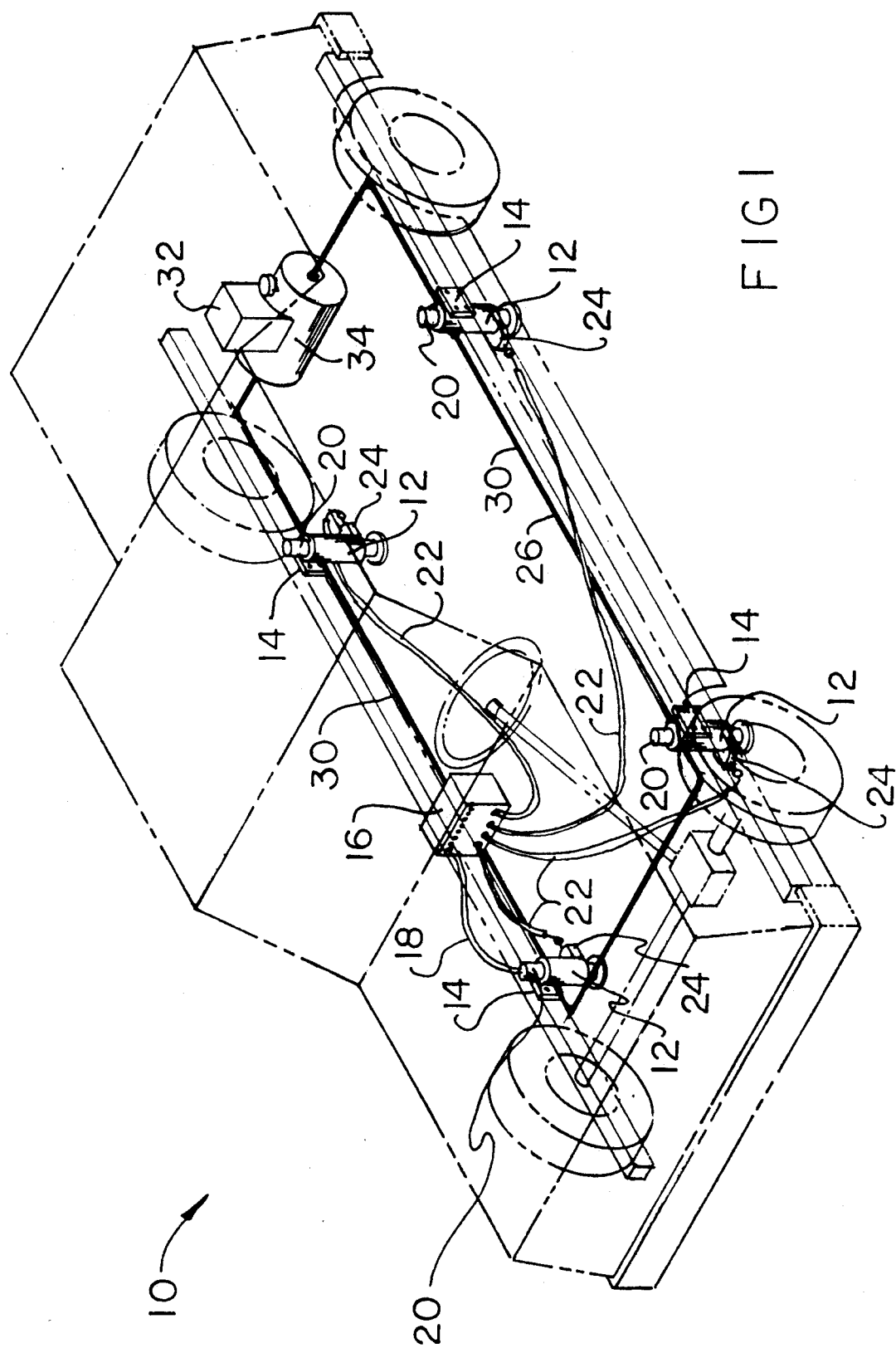
FIG. 1 is a schematic view in perspective showing the basic components of the self-contained vehicle lift system according to the invention.

Turning initially to FIG. 1, there is shown a schematic diagram of a motor vehicle 10 (represented in broken-line format) having four jacking units 12 mounted or otherwise affixed to the frame of the vehicle near each wheel by means of a bracket 14 integrally attached to the vehicle. A central control box or station 16 is conveniently mounted inside the vehicle preferably near the driver's seat and as will be pointed out in more detail below includes a series of control buttons and/or knobs for activation by the operator of the vehicle effective to operate the jacking units 12. Thus, a series of electrical cables 18 (only one is shown for clarity) are connected between the control box 16 and a suitable solenoid activated valve assembly 20 mounted on the top of each jack unit, respectively. Similarly, a series of mechanical cables 22 are connected between control station 16 and a mechanical locking assembly 24 mounted near the bottom of each jack unit, respectively. In the preferred system, jack units 12 are hydraulically activated and accordingly are connected in a hydraulic loop indicated generally by solid line 30 which runs from a suitable hydraulic pump 32 and oil reservoir 34 conveniently mounted on the vehicle preferably in the trunk area of the vehicle. It will be appreciated that although loop 30 diagrammatically indicates that the jack units 12 are connected in series to the oil pump 32 and reservoir 34, the jack units are, in fact, connected in parallel to the pump and reservoir. Thus, it will be understood that a pair of oil lines, i.e., a high pressure line and a low pressure oil line are connected between each jack unit 12 and the oil pump/reservoir. The oil pump 32 preferably is electrically operated and is connected through a suitable on-off switch (not shown) preferably located on control station 16 to the vehicle's electrical system.

In accordance with the present invention and as will be more fully described below, the operator of vehicle 10 may operate the jack units 14 by manipulation of the controls at station 16 without leaving the vehicle. The jack units may be operated individually or collectively depending on need. For example, if it is desired to change a tire, the jack unit located near that wheel will be activated facilitating the tire change in only a few minutes time. Similarly, if it is desired to change oil or lubricate the chassis, a pair of jack units may be operated simultaneously lifting either a selected end or side of the vehicle. Finally, if it is desired to prevent theft of the vehicle, all four jacks may be operated simultaneously to totally lift the vehicle off the ground and render it immobile.

Turning now to FIGS. 2–4, control box station 16 has a front panel 36 in which is suitably mounted a row of push buttons 38 for activating a corresponding electrical switch 40 connected to each one of electrical cables 18, respectively, which, in turn, extend through corresponding apertures on rear panel 42 of the box. Thus, by pressing push button 38 the corresponding solenoid assembly 20 located on the top of each jacking unit 12 may be operated between an "on" condition and an "off" position. Also, suitably mounted on front panel 36 of control box 16 is a similar row of pull-knobs 454. Each knob 44 is suitably fastened to a pull-rod 46 which, in turn, is connected via an eyelet 48 to a corresponding mechanical cable 22. The pull-rod 46 is supported for linear movement in a collar 50 suitably secured to panel 36. Each cable 22 is housed in a separate protective sheath 52 whose open end is anchored to the floor panel 54 of box 16 via bracket 56. By grasping pull-knob 44 and pulling pull-knob 44 toward the vehicle operator and/or away from panel 36, linear movement of pull-rod 46 and cable 22 will result effective to release a corresponding jack unit locking assembly as will be further explained. It will be appreciated from the above description and FIGS. 2–4 that separate pairs of controls re provided on front panel 36 of control box 16 corresponding to each separate jack unit 12, respectively, and, if desired, suitable indicii may be carried on the front panel to identify which pair of controls corresponds to which jacking unit. In the preferred arrangement, the letters "RF", "LF", "LR", and "RR" are employed corresponding to jack units near each of the vehicle's wheels (e.g. "RF"=right-front wheel, etc.). Similarly, if desired, a suitable indicator may be used to tell when the switches 38 are in their activated or "on" condition such as, for example, a "light" in the switch button which is turned on when the switch button is depressed, and is turned off when the switch button is depressed again.

Figure 5:
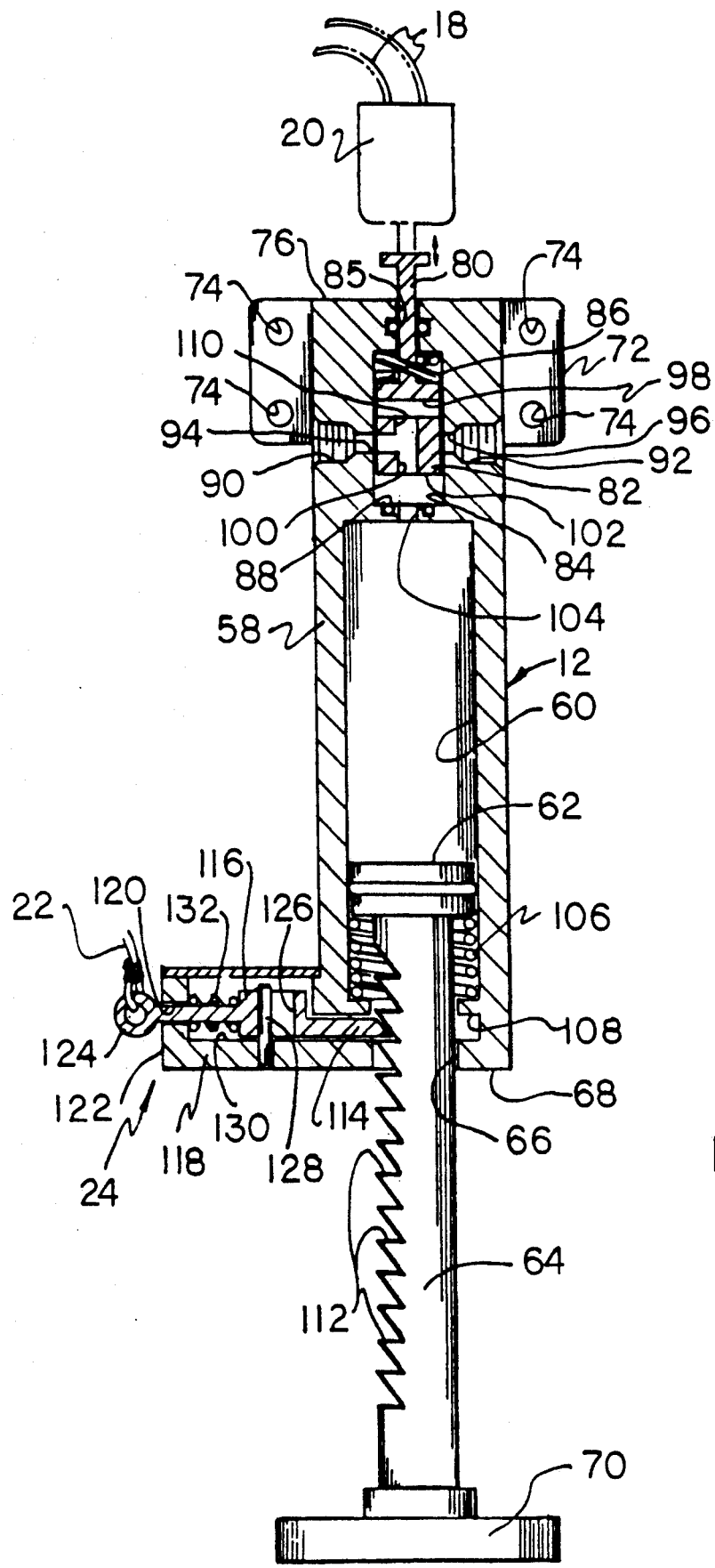
FIG. 5 is a cross-sectional elevational view of the hydraulic jacking unit of the present invention in the activated and extended condition.
Figure 6:
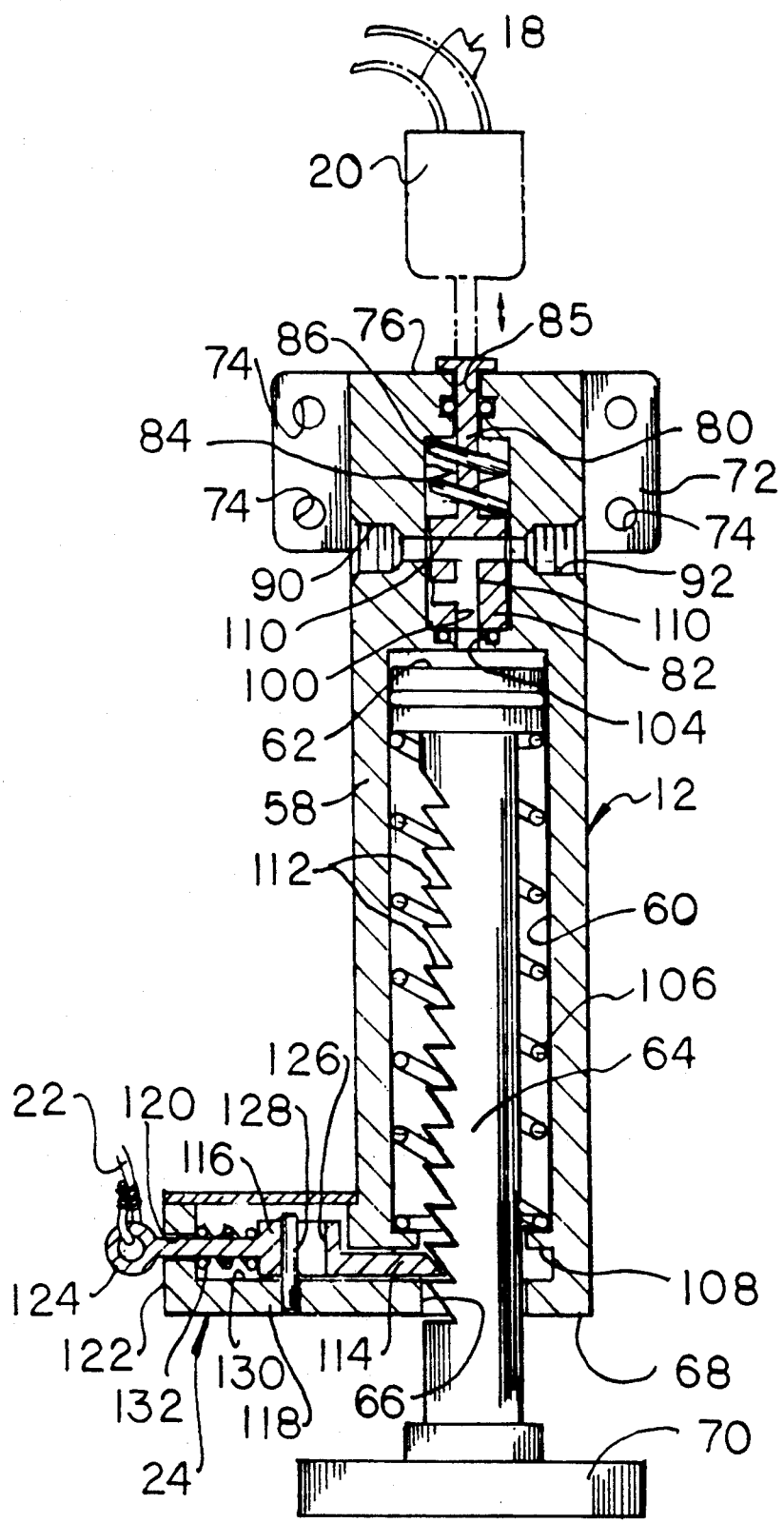
FIG. 6 is a cross-sectional elevational view of the hydraulic jacking unit of the present invention in the deactivated or retracted condition.

Turning now to FIGS. 5 and 6, the structural details and operation of each jacking unit 12 will be described. Each jacking unit 12 comprises a cylindrical barrel 58 having an elongated, cylindrical cavity 60 in which a piston 62 is adapted to be displaced from a fully retracted position (FIG. 6) to a fully extended position (FIG. 5). A piston rod 64 is rigidly connected to piston 62 and depends therefrom through a suitable recess 66 in the bottom end plate 68 of barrel 58 terminating in foot pad 70.

At the upper end of barrel 58, a flanged mounting-bracket 72 having a series of through holes 74 therein is integrally attached. The bracket 72 facilitates rigid mounting of jacket unit 12 to the frame of a vehicle via the use of suitable bolt fasteners inserted through holes 74 and similar aligned holes in the frame. Alternatively, flange 72 may be welded to the vehicle frame.

Suitably mounted on top end plate 76 of barrel 58 is solenoid 20 (indicated by broken lines) whose armature is suitably connected to plunger arm 80 of a hydraulic spool valve 82 mounted for slidable movement in valve cavity 84 in the upper end of barrel 58 substantially as shown. Plunger arm 80 slides through a passageway 85 extending through top end plate 76. A coiled compression spring 86 circumscribing plunger arm 80 above hydraulic spool valve 82 normally biases the valve into engagement with the bottom end 88 of valve cavity 84 when solenoid 20 is in the "off" or de-energized condition (FIG. 6). However, when the solenoid is energized, the spool valve 82 is adapted to slide in cavity 84 to the position shown in FIG. 5 (i.e. the energized or "on" position).

Barrel 58 includes a pair of hydraulic fluid line ports 90, 92 radially and orthogonally aligned with valve cavity 84. Port 90 is a "high" pressure input connected to the output of pump 32 whereas port 92 is a "low" pressure input connected to oil reservoir 34. Ports 90, 92 communicate with valve cavity 84 via passages 94, 96, respectively. Hydraulic spool valve 82 includes a first passage 98 extending therethrough and a second passage 100 having a right angle turn extending from the side of the valve proximal to "high" pressure port 90 to and through the bottom face 102 of the valve. A passage 104 extends longitudinally between valve cavity 84 and cylinder cavity 60 and provides a flow path into the cylinder cavity for high pressure hydraulic fluid (e.g. oil) through input port 90, passage 94, and right angle passage 100 of spool valve 82 when solenoid 20 is in the energized condition and spool valve is displaced to its maximum upward position as shown in FIG. 5. In this condition, "high" pressure hydraulic fluid impinges against piston 62 causing piston rod 64 and foot pad 70 to displace to its fully extended position against the force of coiled compression spring 106 circumscribing the upper end of piston rod 64 between the underside of piston 62 and an annular shoulder 108 extending radially inwardly from the cavity wall near the distal portion of barrel 58. This condition corresponds to the fully extended position of the jack 12 and is effective to raise the vehicle frame with respect to the ground.

When spool valve 82 is in its bottom or "off" position (occasioned by its corresponding switch 40 being "off") passage 98 connects the "low" pressure port 92 to the "high" pressure port 90 through passages 96, 98, and 94 (FIG. 6). A longitudinal "bleed" passage 110 is provided in valve 82 connecting passages 98 and 100. Thus, in the "off" position of solenoid 20 and with no "high" pressure hydraulic fluid being supplied to port 90 (corresponding to pump 32 being switched "off"), compression spring 106 will be effective to urge piston 62, piston rod 64, and foot pad 70 upwardly to the position shown in FIG. 6 because any hydraulic fluid in cavity 60 will be free to flow through passages 104, 100, 110, 98, and "low" pressure port 92. This condition corresponds to the fully retracted position of the jack 12, and permits the vehicle to operate in its normal intended manner.

In accordance with an important feature of the invention, means are provided for automatically locking the piston rod 64 in its fully extended position and for selectively releasing the locking means to return the piston rod to its fully retracted position. Thus, piston rod 64 carries on one side thereof substantially as shown a row of ratchet teeth 112 which latter are adapted to be cooperatively engaged by a pawl 114 carried at one end of a slidable shuttle member 116 constrained for lateral movement within a suitable housing 118 extending laterally from the bottom end 68 of barrel 58. Housing 118 has a passage 120 extending through its distal end wall 122 through which the arm 123 of shuttle member 116 extends with the arm 124 terminating in an eyelet 124 through which cable 22 may be connected. A transversely elongated slot 126 is disposed centrally of shuttle member 116 for the purpose of engaging the free end of a rigid pin 128 captured in a suitable recess in the bottom wall 130 of housing 118. A coiled compression spring 132 is disposed between end wall 122 and the central portion of shuttle member 116 substantially as shown and urges the pawl 114 into engagement with ratchet teeth 112 as the piston arm 64 and foot pad 70 are displaced to their fully extended position in response to high pressure hydraulic fluid impinging against piston head 62. By this arrangement, the piston arm and foot pad will be locked into the fully extended position (FIG. 5) even after "high" pressure hydraulic fluid is removed from input port 90.

It will be appreciated that by pulling cable 22 to the left as viewed in FIG. 5, shuttle member 116 will slide to the left until prevented from further displacement by the action of pin 128 in slot 126. This lateral movement will be sufficient, however, to cause pawl 114 to disengage from ratchet teeth 112 thereby permitting the piston head 62, piston arm 64 and foot pad 70 to displace upwardly under the action of spring 106. Any hydraulic fluid in the cylinder cavity will flow through passages 104, 100, 110, 98 and "low" pressure port 92 thereby damping the movement of the piston assembly until it reaches its fully retracted condition shown in FIG. 6.

It should be apparent from the above description that activation of each or any of the jack units 12 may be effected by merely pressing the button 38 corresponding to switch 40 of the unit or units desired to be operated. This will cause energization of the corresponding solenoid 20 and concomitant movement of spool valve 82 to its upper limit position thereby enabling "high" pressure hydraulic fluid to impinge against the jack's piston assembly. Likewise, it should be apparent that by manually pulling a selected knob 44 away from panel 36 of control station 16 and causing corresponding movement of a selected cable 22, the corresponding jack unit 12 may be unlocked and returned to its fully retracted position. Of course, operation of the jack units 12 should not be undertaken until and unless the vehicle engine is shut down and the vehicle is parked on flat terrain. In such cases, pump 32 still will receive energy from the vehicle's electrical system (battery).

Although the self-contained lift system of the present invention has been disclosed with reference to individual jack units employing hydraulic fluid, it will be understood that the use of a pneumatic fluid such as compressed air may be utilized instead.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing form the principles and concepts set forth. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and self-contained vehicle lift system comprising:
    at least one jack attached to the frame of a vehicle, said jack being operable between a fully extended position and a fully retracted position,
    remote control means mounted in said vehicle activatable to cause said jack to operate to its fully extended position,
    means coupled to said jack to automatically lock said jack in its fully extended position, and disabling means associated with said remote control means and coupled to said means for automatically locking said jack in its fully extended position whereby operation of said disabling means is effective to unlock said automatic locking means and return said jack to its fully retracted position,
    wherein said jack comprises a piston assembly, a cylinder having a central axis, said piston assembly being moveable in said cylinder along said axis, said cylinder being affixed to said vehicle, valve means on said cylinder in coaxial alignment with said cylinder and being moveable between first and second positions along said axis, working fluid supply means mounted on said vehicle and being connected to said valve means, and valve activating means for activating said valve means to cause said valve means to move from said first position to said second position whereby said working fluid is caused to flow through said valve means into said cylinder and thereby cause said piston to move in said cylinder to a fully extended position.

2. The invention of claim 1 wherein said jack comprises a piston assembly moveable in a cylinder, said cylinder being affixed to said vehicle, and wherein said locking means comprises ratchet means on said piston assembly, and pawl means on said cylinder engageable with said ratchet means.

3. The invention of claim 2 wherein said disabling means comprises means for disengaging said pawl means from said ratchet means.

4. The invention of claim 3 wherein said means for disengaging comprises a cable connected at one end to said pawl means and connected at its other end to said remote control means.

5. The invention of claim 1 wherein said valve activating means comprises a solenoid attached to said valve means, and said remote control means comprises a switch for activating said solenoid to cause said valve means to move whereby said fluid is enabled to flow through said valve means to move said cylinder.

6. The invention of claim 1 wherein said at least one jack is attached rigidly to said vehicle frame in the vicinity of a wheel on said vehicle.

7. The invention of claim 1 further comprising a plurality of individual jacks attached at separate points to said vehicle frame, said remote control means being located inside said vehicle, and said remote control means being operatively coupled to each of said jacks comprising said plurality of said jacks.

* * * * *